Figure 7:
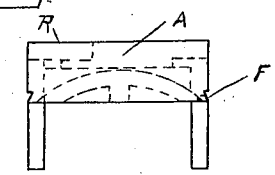

June 24, 1930.    J. J. DONOVAN    1,768,238
MACHINERY USED IN THE MANUFACTURE OF LEATHER GOODS AND FABRICS
Filed Aug. 31, 1928    2 Sheets-Sheet 1
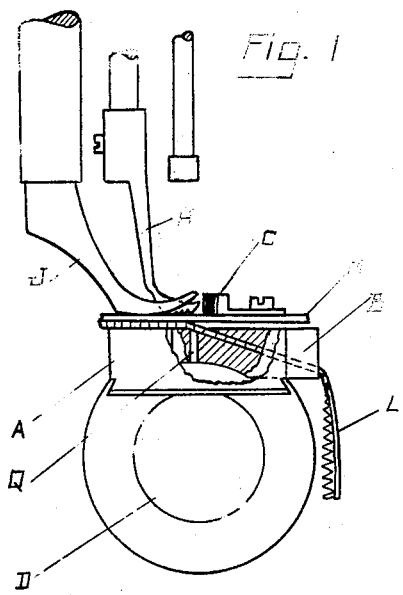
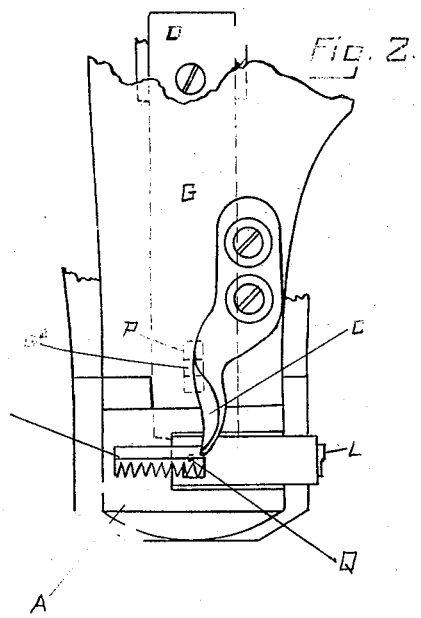
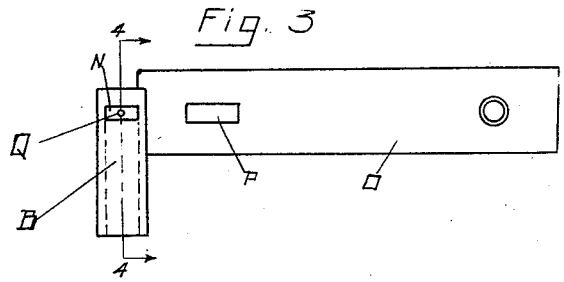
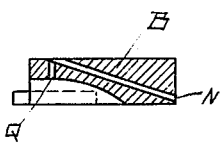
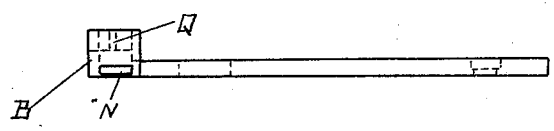
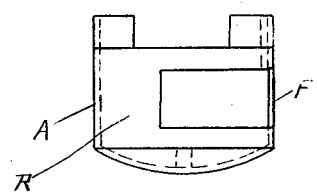
John J. Donovan Inventor
By Charles H. Lovett
Attorney June 24, 1930.  J. J. DONOVAN  1,768,236
MACHINERY USED IN THE MANUFACTURE OF LEATHER GOODS AND FABRICS
Filed Aug. 31, 1928  2 Sheets-Sheet 2

John J. Donovan, Inventor
By Charles H. Pratt
Attorney

Patented June 24, 1930

1,768,236

UNITED STATES PATENT OFFICE

JOHN J. DONOVAN, OF LYNN, MASSACHUSETTS

MACHINERY USED IN THE MANUFACTURE OF LEATHER GOODS AND FABRICS

Application filed August 31, 1928. Serial No. 303,141.

My invention relates to machinery used in the manufacture of leather goods and fabrics, and more particularly to that class of machinery used in applying adhesive substances such as piping and tapes for trimming, reinforcing and decorative purposes on leather and fabrics. It will be found particularly useful in the manufacture of shoes.

It has for its purposes, to provide a new and novel mechanism for use in applying prepared adhesive substances, now largely used for trimming, decorative and reinforcing purposes; to insure a perfected application of such prepared adhesive substances; to provide an improved centralized combination feed and guiding device (that is to say feeding and guiding means which feeds and guides the tape to the point of axis of the work and that permanent point of contact of the tape on the work demanded by perfection in product. By "point of axis" is meant that particular centralized spot on the machine which forms the pivoting point upon which and only upon which the work turns. The permanent point of contact of the tape upon the work as demanded by perfection in product is had as the work passes this point of axis so that the point of axis and the said permanent point of contact are interchangeably referred to by the phrases "point of axis" and "permanent point of contact"); to minimize the exposure of the adhesive surface during the operation; to centralize the essential pivoting point for advantage in applying the adhesive substance to curved edges; to provide a new and novel mechanism adaptable for applying adhesive substance with perfection on or near edges having sharp or gradual turns; to minimize working parts; to particularly eliminate the separate guide attachment heretofore always a source of obstruction to the material used in perfecting the complete operation; to feed and maintain the adhesive substance separate and apart from the material on which it is to be attached until the permanent point of contact demanded by perfect production is reached so that the point of axis of the work and the tape are one and the same place; to provide a novel inclined and enclosed combination channel member and feed through which the adhesive substance is guided and fed to the said permanent point of contact; to provide an improved combination feed and guiding device adaptable for use either in stitching or adhesive application, or both; to provide an unobstructed travelling plane upon which to operate; to provide improved pressing and feeding feet adaptable for perfected contact with the adhesive substance, particularly adaptable for folded edge work; to provide a fixed plate contact for the presser foot in its pressing position; to provide an improved means for controlling the finished edge of the adhesive substance during the attaching operation; and to provide the various other advantages and results made evident from the following specification.

Figure 8:
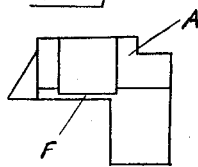
Figure 9:
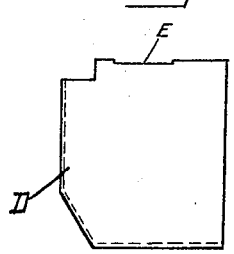
Figure 10:
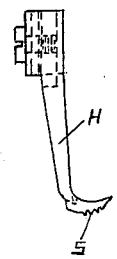
Figure 11:
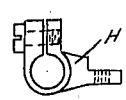
Figure 12:
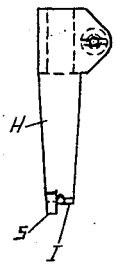
Figure 13:
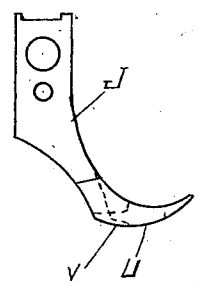
Figure 15:
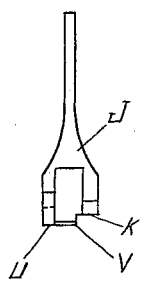
Figure 14:
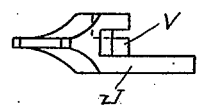

I accomplish the objects of my invention as illustrated in the accompanying drawings which form a part of this specification and in which Figure 1 shows my mechanism with a section of the combination guiding member and feed cut away, all as assembled on a machine of the general type used in stitching, and showing the adhesive substance in position for attaching. Figure 2 is a top view of the oscillating guide plate and mechanism shown in Figure 1 minus the feeding foot, presser foot and needle bar. Figure 3 is a top view of my combination feed and guide member. Figure 4 is a sectional view of the combination feed and guide member on line 4—4 shown in Figure 3. Figure 5 is a front view thereof. Figure 6 is a top view of the table in which the combination feed and guide member shown in Figure 3 works and oscillates. Figure 7 shows an end view of the table. Figure 8 shows a front view thereof. Figure 9 shows a front view of the shuttle cover. Figure 10 is a side view of my improved feed foot. Figure 11 is a top view thereof. Figure 12 is a front view. Figure 13 is a side view of my improved presser foot. Figure 14 is a top view thereof. Figure 15 is a front view.

Referring again to the drawings, A shows the work table in which my combination feed and guide B works and oscillates. C shows the adjustable edge guide which also functions with the combined guide and feed B to control the finished edge of the adhesive substance. D shows the shuttle cover, notched at E to provide clearance for the oscillating of the combination guide and feed B on the plane rail F, (see Fig. 9). G shows the oscillating guide plate to which the adjustable edge guide C is attached. H shows the feed foot adaptable to function with the combination guide and feed member B in carrying the work forward. I shows the raised portion of the tread. J shows the presser foot. K shows the raised portion of its tread. L shows the adhesive substance. M shows the material to which the adhesive material is to be attached.

Referring again to Figure 2, L shows the adhesive substance in position for the attaching operation.

Referring again to Figures 3, 4 and 5, N shows the inclined channel through which the adhesive substance L is guided to the feeding foot H. The arm portion of the combination feed and guide is designated by O. P shows a slot designed to engage the projecting pilot $G^2$ on the under side of the oscillating guide plate G. Q shows the position of the needle hole and operating center of the mechanism.

Referring again to Figures 6, 7 and 8, R shows the fixed plate contact adaptable to engage the presser foot in its presser position. F shows the plane rail or frontal support on which the combination feed and guide B oscillates.

Referring again to Figures 10, 11 and 12, I shows that portion of the tread raised above the normal plane S adaptable for perfected contact with the adhesive substances, and designed particularly for folded edge work.

Referring again to Figures 13, 14, and 15, K shows that portion of the tread raised above the normal plane U also adaptable for perfected contact with the adhesive substance and especially for folded edge work. V shows the tread extension adaptable for contact at R on the table A, and designed to there engage and press the materials used adjacent to the feed foot H and at the precise time the feed foot pressure is released.

I term that portion of the machine from which the feed and presser feet extend, the overhanging arm. The spot between the feed foot and the combination guide and feed I term the permanent point of contact, i. e., the place where the adhesive substance fed through the guide first and finally contacts with the material to which it is attached.

It will be seen that the combination feed and guide B, oscillating in the work table A acts in conjunction with the feed foot H in carrying forward the material fed over the work table to the point between the presser foot J and the fixed plate contact R. It will be appreciated that the distance from the combinaton feed and guide B to the permanent point of contact is very short, thus minimizing the exposure of the adhesive surface during the operation and centralizing the essential pivoting point for advantage in applying the adhesive substance to curved edges, sharp or gradual turns.

Similar letters of reference refer to similar parts throughout the various views.

While I have illustrated and described a preferred construction for carrying my invention into effect, this is capable of variation or modification without departing from the spirit of the invention. I therefore do not wish to be limited to the exact details of construction herein set forth but desire to avail myself of such variations and modifications as come within the scope of the appended claims.

Having thus described my invention I claim as new and desire to secure by letters patent of the United States of America:

1. A machine including in combination, a work table, an overhanging arm, carrying thereon means operating in conjunction with "other means thereunder" for feeding material over the work table, said overhanging arm carrying additional means adaptable to press the material fed against a fixed plate contact therebeneath, said "other means thereunder" comprising a combined feed and guide member adaptable to oscillate in said work table and having a channel formed therein through which adhesive substance approaches the permanent point of contact.

2. The combination with a work table, a presser foot, a fixed plate contact thereunder, an overhanging arm, and feed mechanism the lower portion of said feed mechanism being formed to act as a guide for material fed therethrough.

3. A machine including in combination, a work table, an overhanging arm carrying thereon, a feed foot having a portion of its tread raised above its remaining tread portion, and a presser foot also having a portion of its tread raised above its remaining tread portion, a combined feed and guide member, an oscillating guide plate and means for oscillating the combined feed and guide member within said work table.

4. In a machine of the kind described a centralized combination feed and guide member adaptable to oscillate in a work table, a feed foot, a presser foot, and a fixed plate contact, all adaptable to function with each other and with said feed and guide member.

5. The combination with a work table, a presser foot, a fixed plate contact thereunder, and feed mechanism comprising a feed foot and oscillating feed and guide member thereunder adaptable for feeding and guiding a strip of material underneath the presser foot up to the point of axis of the work and point of permanent contact of the tape on the work where the work and tape turn simultaneously.

6. A machine for securing a strip of material in a curved path of sharp or gradual turns, comprising a centralized combination feed and guide member, and a fixed plate contact both below the plane of the permanent point of contact and a feed foot and a presser foot above said point of contact.

7. In a machine of the kind described, a centralized feed and guide member adaptable to oscillate in a work table, a feed foot, a presser foot, a fixed plate contact, a notched shuttle cover, and an oscillating guide plate.

In testimony whereof I affix my signature.

JOHN J. DONOVAN.